Oct. 6, 1942.  S. CERSTVIK  2,297,873

RATE OF CLIMB INDICATOR

Filed Oct. 30, 1940

Inventor

Stephen Cerstvik.

By

C. J. Kalman

Attorney

Patented Oct. 6, 1942

2,297,873

UNITED STATES PATENT OFFICE 2,297,873

RATE OF CLIMB INDICATOR

Stephen Cerstvik, Newark, N. J., assignor to Bendix Aviation Corporation, Bendix, N. J., a corporation of Delaware Application October 30, 1940, Serial No. 363,572

7 Claims. (Cl. 73—179)

This invention relates generally to pressure responsive instruments and more particularly to rate of climb indicators of the "pressure vane" type for use in aircraft, wherein a differential between the pressures outside and inside of the instrument, established by a change of one of the pressures, is utilized to indicate the rate of climb or descent, and wherein communication between the outside and inside pressures is controlled so as to provide for equalization of the pressures when the condition causing the change has ceased to exist.

An object of the present invention is to provide a novel rate of climb indicator of the "pressure vane" type which is simple and inexpensive in construction, dependable in operation and particularly adapted for use in small private aircraft.

Another object of the invention is to provide a novel rate of climb instrument of the "pressure vane" type having a minimum number of parts and producing vertical linear movement of the indicating means during the presence of a pressure differential between the inside and outside instrument pressures.

A further object of the invention is to provide a novel rate of climb instrument of the "pressure vane" type in which the indicator responds instantly and directly to the pressure differential of the inside and outside instrument pressures.

Another object of the invention is to provide a novel rate of climb indicator of the character above described wherein the pressure actuated member constitutes the indicating means for indicating the rate of climb or descent.

A further object is to present a form of the invention wherein auxiliary sealed chambers or reservoirs such as "thermos bottles" heretofore used in known "pressure vane" type of rate of climb instruments may be dispensed with, thus materially reducing the weight of the device.

The above and further objects and novel features of the invention will more fully appear from the following detailed description when the same is read in connection with the accompanying drawing. It is to be expressly understood, however, that the drawing is for purposes of illustration only and is not intended as a definition of the limits of the invention, reference for the latter purpose being had to the appended claims.

In the drawing, wherein like reference characters refer to like parts, throughout the several views.

Figure 1:
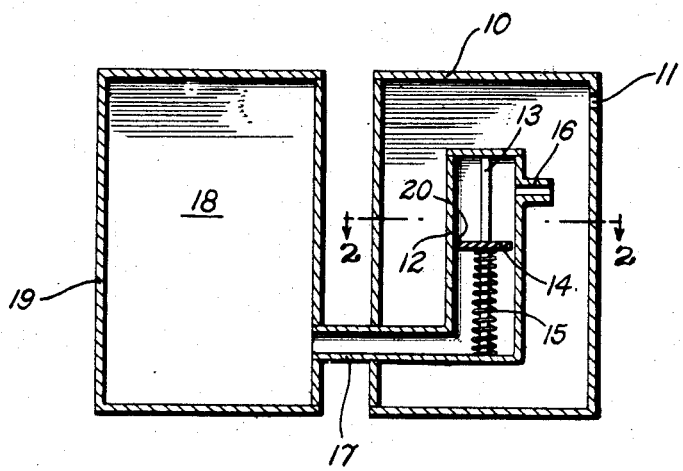
Figure 1 is a side elevation, in section, a portion of which section is taken substantially along line 1—1 of Figure 2, of a rate of climb indicator embodying the invention.

The novel rate of climb instrument comprises, as clearly shown in Figure 1 of the drawing, a sealed housing 10 having the interior thereof in unrestricted communication with the atmosphere outside thereof by way of an aperture 11, whereby the pressures within the interior of the housing are at all times equal to those outside of the housing.

Suitably disposed within the housing 10 is a casing or chamber 12 provided with a vertical shaft or guide rod 13 longitudinally disposed therein at the central portion thereof which slidably supports thereon a pressure vane or plate 14 for reciprocating vertical linear movement within the chamber 12. A coil spring 15 surrounding the guide rod 13 is calibrated and designed to normally maintain the pressure plate 14 at a predetermined or central position within the chamber 12, and is anchored at one end to the chamber 12 and at its other end to the plate 14.

One end of the chamber 12 is in unrestricted communication with the pressures within the interior of the housing 10 by way of a conduit 16 which, if desired, may be formed integrally with the chamber 12, while the opposite end of the chamber is in communication by way of a conduit 17, passing through an aperture of the housing 10, with reservoir chamber 18 defined by a housing or casing 19 formed of thermally insulated material, for example, whereby variations in temperatures will be ineffective to disturb proper indications of the instrument.

A clearance space or capillary gap 20 is defined between the outer periphery of the pressure plate 14 and the inner walls of chamber 12, whereby restricted communication is provided between the pressures at opposite sides of pressure plate 14.

Figure 3:
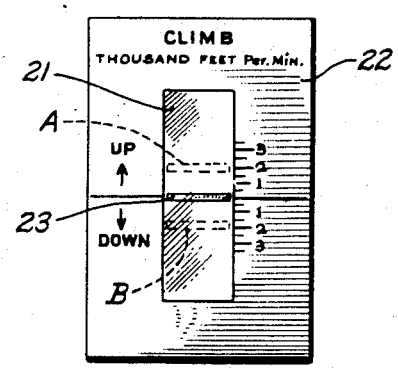
Figure 3 is a front elevation of the rate of climb indicator as shown in Figure 2.
Figure 2:
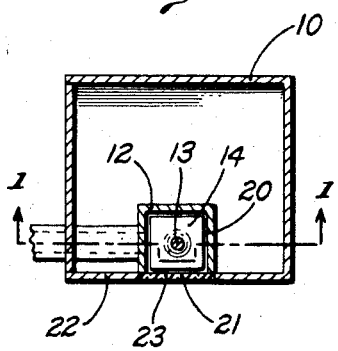
Figure 2 is a top view of a section taken substantially along line 2—2 of Figure 1.

The chamber 12, in the present instance, is disposed so as to have one wall 21 thereof integral with a portion of a side wall 22 of housing 10 and, as shown in Figures 2 and 3, may be formed of glass or other transparent material so as to define a cover glass or window exposing the end 23 of plate 14 to view from the side wall 22 of the housing 10. The end 23 of the plate 14 in this manner constitutes an indicator or pointer. The side wall 22 is further provided with calibrations or graduations thereon for designating rate of climb or descent of the craft embodying the instrument and having an index thereon designating zero position with which the pointer or end 23 of plate 14 is urged to coincide by the spring 15 during normal conditions.

In operation, as the craft, upon which the present novel rate of climb instrument is provided ascends, the altitude increases and the surrounding atmospheric pressures consequently decrease. The decreased pressures are instantly communicated to the interior of housing 10 by way of aperture 11 and to the chamber 12 above the plate 14 by means of conduit 16 and act upon the top end of plate 14. The pressures below plate 14, however, and within the reservoir chamber 18 cannot immediately equalize with the outside pressures due to the resistance to flow offered by the capillary gap 20, and since the pressures within the reservoir chamber 18 are greater than those within the housing 10, the greater pressures will exist below pressure plate 14 and, therefore, the plate will be urged against the action of spring 15 in an upward direction to a position, for example, such as indicated in dotted lines at A, thereby carrying the pointer or end 23 thereof adjacent the window or glass wall 21 to indicate the rate of climb of the craft.

When the craft levels off so that altitude change no longer takes place, flow takes place from reservoir chamber 18 to the interior of housing 10 by way of the clearance space or capillary gap 20 thereby equalizing the pressures, whereupon the pointer or end 23 of plate 14 under the action of spring 15 is urged to its normal position, thereby indicating zero rate of climb.

The reverse of the above operation occurs when the craft descends, thereby decreasing the altitude and proportionately increasing the surrounding atmospheric pressures. The increased pressures are instantly communicated to the interior of housing 10 and chamber 12 above plate 14 by way of aperture 11 and conduit 16. At this point the pressures are greater above the plate 14 than below the plate and within the reservoir chamber 18 and the plate is therefore urged downward against the action of spring 15 carrying pointer or end 23 thereof adjacent the window or glass wall 21 to a position, for example, such as that shown in dotted lines at B, to thereby indicate rate of descent. The pressures again equalize through the capillary gap 20 when the craft levels off and the pointer or end 23 of plate 14 is urged to its zero or normal position by the action of spring 15.

It will now become readily apparent to those skilled in the art that a novel, simple and inexpensive rate of climb indicator of the "pressure vane" type has been provided wherein the pressure vane constitutes the indicating means and is arranged for vertical linear movement adjacent a window forming an integral part of a wall of the chamber embodying the pressure vane.

Figure 4:
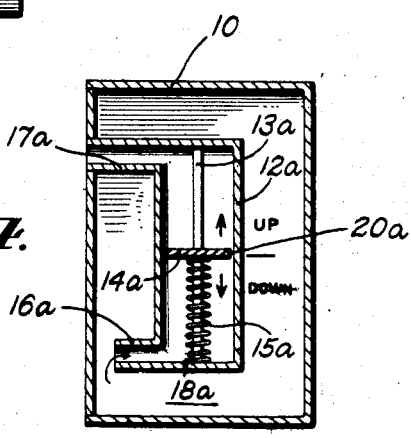
Figure 4 is a side elevation, in section, of a rate of climb indicator illustrating a second embodiment of the invention.

The use of an auxiliary thermally sealed reservoir 18 shown in Figure 1 may be dispensed with and the interior of the housing 10 may be utilized as a reservoir chamber 18a as better shown in the embodiment of Figure 4.

In this latter embodiment, a chamber 12a is suitably disposed within the reservoir chamber 18a of housing 10 and is provided therein with a shaft or guide rod 13a longitudinally disposed at the central portion thereof. Sleeved about the rod 13a and mounted for vertical sliding movement thereon is a pressure plate 14a. A spring 15a anchored at one end to an end of the chamber 12a and at the other end to the pressure plate 14a normally urges the plate 14a to a predetermined normal zero position adjacent a window formed as a portion of a wall of the housing and chamber in the same manner as hereinabove described in connection with the invention of Figures 1 to 3, inclusive.

The interior of chamber 12a above plate 14a is in direct unrestricted communication with the atmosphere outside of the housing 10 by means of a conduit 17a while the interior of the chamber below the plate 14a is in direct communication with the reservoir chamber 18a by way of a suitable conduit 16a. A capillary gap 20a is formed between the ends of plate 14a and the walls of chamber 12a whereby resistance is offered to flow between the pressures on either end of the plate.

The operation of this embodiment is the same as that described above in connection with Figures 1 to 3, inclusive. When the pressures outside of housing 10 decrease they are communicated to act on the upper end of plate 14a and since the pressure in reservoir chamber 18a is greater, the plate 14a is urged upward against the action of spring 15a to indicate climb, while as the outside pressures increase, the pressure in chamber 18a being smaller at this point, the plate 14a is urged downwardly against spring 15a to indicate descent. When the craft levels off, pressures equalize by way of gap 20a and plate 14a is urged to move to its normal zero position by the spring 15a.

Although but two embodiments of the present invention have been illustrated and described in detail, it is to be expressly understood that the invention is not limited thereto. Various changes and modifications may be made in the design and arrangement of parts without departing from the spirit and scope of the invention, as will now be understood by those skilled in the art. For example, for convenience, the chamber 12 and pressure plate 14 have been shown as having a rectangular cross section. Obviously, the chamber may be circular or oval in shape and the pressure plate designed accordingly, to reciprocate therein. For a definition of the limits of the invention, reference will be had primarily to the appended claims.

What is claimed is:

1. A rate of climb indicator for an aircraft comprising a casing, stationary guide means within said casing, a pressure actuated member sleeved about said guide means for movement within said casing, resilient means within said casing normally urging said member to a predetermined position, means communicating the interior of said casing at one side of said member with the atmosphere outside of said casing, an expansion chamber, means communicating the interior of said casing at the opposite side of said member with said expansion chamber whereby a difference in pressure occurs on the two sides of said member upon a change in altitude, said member loosely fitting said casing to provide a capillary gap between an edge thereof and a wall of said casing whereby said member is actuated against the action of said resilient means upon an occurrance of a pressure difference on the two sides of said member due to a change in altitude and air is caused to flow through said gap to cause equalization of the pressures on the two sides of said member, one edge of said member constituting indicating means, and a window forming a side wall of said casing for viewing said indicating means.

2. A rate of climb indicator for an aircraft comprising a casing, a longitudinal guide rod centrally mounted within said casing, a pressure actuated member within said casing sleeved about and mounted for reciprocal movement relative to said guide rod, a spring member coiled about said rod anchored at one end to said casing and at its other end to said member for normally urging said member to a predetermined position, means communicating the interior of said casing at one side of said member with the atmosphere outside of said casing, an expansion chamber, means communicating the interior of said casing at the opposite side of said member with said expansion chamber whereby a difference in pressure occurs on the two sides of said member upon a change in altitude, said members loosely fitting said casing to provide a capillary gap between an edge thereof and a wall of said casing whereby said member is actuated against the action of said spring upon an occurrence of a pressure difference on the two sides of said member due to a change in altitude and air is caused to flow through said gap to cause equalization of the pressures on the two sides of said member, one edge of said member constituting a pointer, and a window forming a side wall of said casing for viewing said pointer.

3. A rate of climb indicator for an aircraft comprising a casing, a pressure actuated member mounted for reciprocal movement within said casing, resilient means normally urging said member to a predetermined position within said casing, a housing defining an expansion chamber having said casing mounted therein, a window forming a common side wall for said housing and said casing whereby one edge of said member mounted within said casing may be viewed from the exterior of said housing, means communicating the interior of said casing at one side of said member with the atmosphere outside of said housing, means communicating the interior of said casing at the opposite side of said member with the expansion chamber formed by said housing whereby a difference in pressure occurs on the two sides of said member upon a change in altitude, said member loosely fitting said casing to provide a capillary gap between an edge thereof and a wall of said casing whereby said member is actuated against the action of said retaining means upon an occurrence of a pressure difference on the two sides of said member due to a change in altitude and air is caused to flow through said gap to cause equalization of the pressures on the two sides of said member, said one edge of said member viewable through the window from the exterior of said housing constituting indicating means, and scale means adjacent said window for cooperation with said indicating means.

4. A rate of climb indicator for an aircraft comprising a casing, a guide rod centrally mounted within said casing, a pressure actuated member within said casing sleeved about and mounted for reciprocal movement relative to said guide rod, resilient means surrounding said guide rod anchored at one end to said casing and at its other end to said member for normally urging said member to a predetermined position, a housing defining an expansion chamber having said casing mounted therein, a window forming a common side wall for said housing and said casing whereby one edge of said member mounted within said casing may be viewed from the exterior of said housing, means communicating the interior of said casing at one side of said member with the atmosphere outside of said housing, means communicating the interior of said casing at the opposite side of said member with the expansion chamber whereby a difference in pressure occurs on the two sides of said member upon a change in altitude, said member loosely fitting said casing to provide a capillary gap between an edge thereof and a wall of said casing whereby said member is actuated against the action of said resilient means upon an occurrence of a pressure difference on the two sides of said member due to a change in altitude and air is caused to flow through said gap to cause equalization of the pressures on the two sides of said member, said one edge of said member viewable through the window from the exterior of said housing constituting a pointer, and scale means adjacent said window for cooperation with said pointer.

5. A rate of climb indicator for an aircraft comprising a casing, a pressure actuated member mounted for reciprocal movement within said casing, resilient means normally urging said member to a predetermined position within said casing, a housing defining a chamber communicating with the atmospheric pressures existing exterior thereof and having said casing mounted therein, a window forming a common side wall for said housing and said casing whereby one edge of said member mounted within said casing may be viewed from the exterior of said housing, a second housing defining an expansion chamber, means communicating the interior of said casing at one side of said member with the atmospheric pressure within said first housing, means communicating the interior of said casing at the opposite side of said member with the expansion chamber formed by said second housing whereby a difference in pressure occurs on the two sides of said member upon a change in altitude, said member loosely fitting said casing to provide a capillary gap between an edge thereof and a wall of said casing whereby said member is actuated against the action of said retaining means upon an occurrence of a pressure difference on the two sides of said member due to a change in altitude and air is caused to flow through said gap to cause equalization of the pressures on the two sides of said member, said one edge of said member viewable through the window from the exterior of said first housing constituting a pointer, and scale means for cooperation with said pointer.

6. A rate of climb indicator for an aircraft comprising a casing, a stationary rod within said casing, a pressure actuated member mounted on said rod for movement within said casing, resilient means normally urging said member to a predetermined position, a window forming a side wall of said casing whereby one edge of said member may be viewed from the exterior of said casing, a housing defining an expansion chamber, means communicating the interior of said casing at one side of said member with the atmosphere outside of said casing, means communicating the interior of said casing at the opposite side of said member with the expansion chamber whereby a difference in pressure occurs on the two sides of said member upon a change in altitude, said member loosely fitting said casing to provide a capillary gap between an edge thereof and a wall of said casing whereby said member is actuated against the action of said resilient means upon an occurrence of a pressure difference on the two sides of said member due to a change in altitude and air is caused to flow through said gap to cause equalization of the pressures on the two sides of said member, said one edge of said member viewable through the window from the exterior of said casing constituting indicating means, and scale means for cooperation with said indicating means.

7. A rate of climb indicator for an aircraft comprising a casing, a guide rod centrally mounted within said casing, a pressure actuated member within said casing sleeved about and mounted for reciprocal movement relative to said guide rod, resilient means anchored at one end to said casing and at another end to said member for normally urging said member to a predetermined position, a housing defining a chamber communicating with the atmospheric pressures existing exterior thereof and having said casing mounted therein, a window forming a common side wall for said housing and said casing whereby one edge of said member may be viewed from the exterior of said housing, a second housing defining an expansion chamber, means communicating the interior of said casing at one side of said member with the atmospheric pressure within said first housing, means communicating the interior of said casing at the opposite side of said member with the expansion chamber whereby a difference in pressure occurs on the two sides of said member upon a change in altitude, said member loosely fitting said casing to provide a capillary gap between an edge thereof and a wall of said casing whereby said member is actuated against the action of said resilient means upon an occurrence of a pressure difference on the two sides of said member due to a change in altitude and air is caused to flow through said gap to cause equalization of the pressures on the two sides of said member, said one edge of said member constituting an indicating means, and scale means for cooperation with said indicating means.

STEPHEN CERSTVIK.